S. TOUSEY.
CELL DIAPHRAGM FOR X-RAY APPARATUS.
APPLICATION FILED APR. 23, 1919.
1,381,521.
Patented June 14, 1921.
3 SHEETS—SHEET 2.
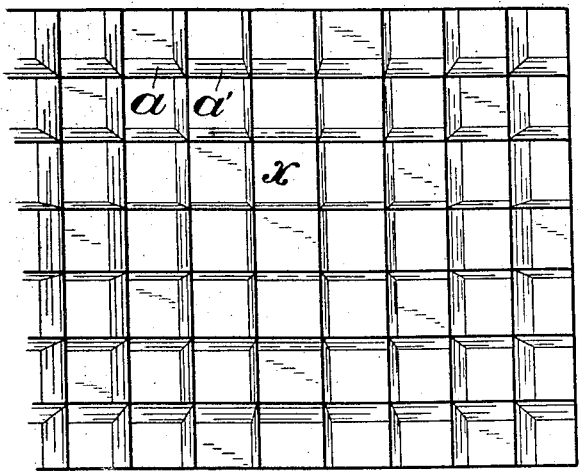
Fig. 5.
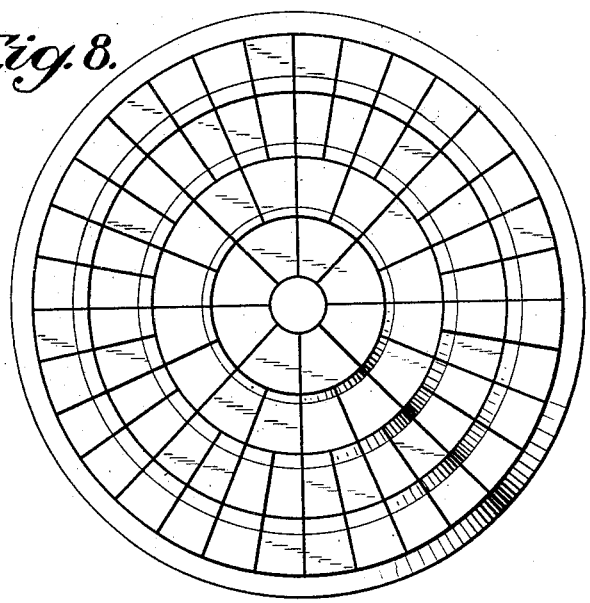
Fig. 8.
Fig. 9.
Inventor:
Sinclair Tousey

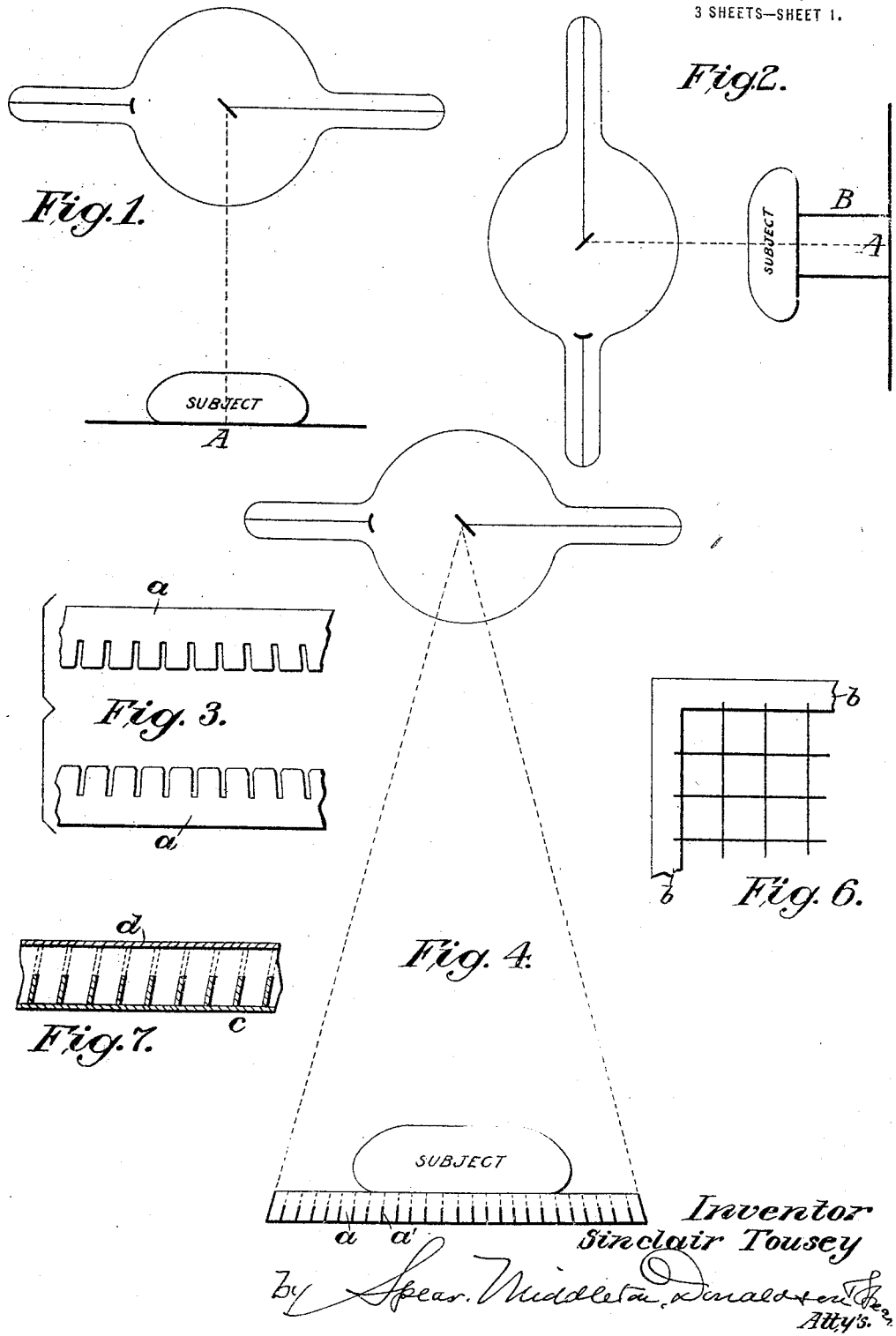

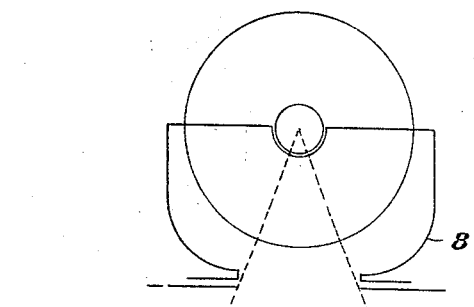
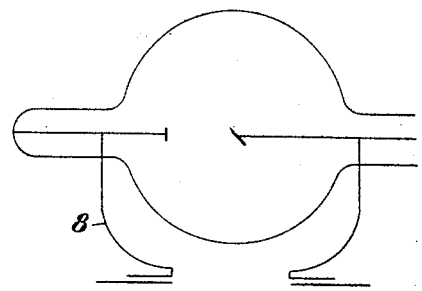
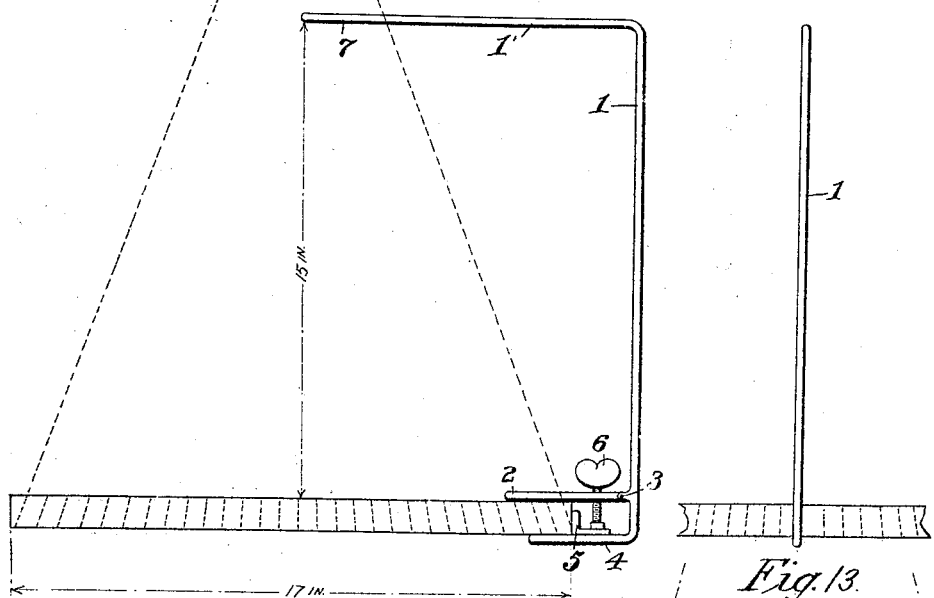
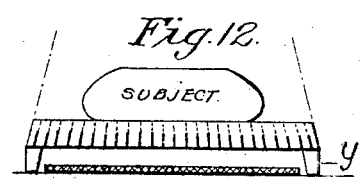
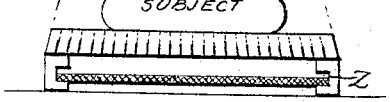

UNITED STATES PATENT OFFICE.

SINCLAIR TOUSEY, OF WESTHAMPTON BEACH, NEW YORK.

CELL-DIAPHRAGM FOR X-RAY APPARATUS.

1,381,521.        Specification of Letters Patent.        Patented June 14, 1921.

Application filed April 23, 1919. Serial No. 292,136.

*To all whom it may concern:*

Be it known that I, SINCLAIR TOUSEY, a citizen of the United States, and resident of Westhampton Beach, New York, have invented certain new and useful Improvements in Cell-Diaphragms for X-Ray Apparatus, of which the following is a specification.

The invention relates to means for excluding from the photographic plate rays which are diffused from the subject.

In the drawings:

Figure 1 is a diagrammatic view of an X-ray tube, a plate to receive the image and a conventional representation of the subject.

Fig. 2 is a view of a hollow cylinder of X-ray opaque material interposed between the subject and the photographic plate.

Fig. 3 is a view of parts of two of the elements from which my apparatus is built up.

Fig. 4 is a diagrammatic view of an X-ray tube with my improved apparatus associated therewith.

Fig. 5 is a plan view of a number of cells forming a part of the apparatus.

Fig. 6 is a detail view showing how the strips forming the cells may be held in a frame.

Fig. 7 is a sectional view showing the cell case provided with top and bottom members.

Fig. 8 is a view of a modification.

Fig. 9 shows a portion of a strip from which the diaphragm may be formed.

Fig. 10 is a view of a gage in its relation to the tube and cell diaphragm.

Fig. 11 is a view a quarter turn from Fig. 10.

Figs. 12 and 13 show means for holding the plates.

The following relates to an apparatus for favorably affecting the X-rays after they leave the subject under examination.

The following observation has long been common knowledge: X rays emerging from the subject consist partly of (1) rays which have radiated from one part or another of the X ray tube (those most desirable of course emanating from the focus point) and have passed through the subject in straight lines, and (2) secondary rays arising in the substance of the subject and radiating in every direction, so that in Fig. 1 a portion of the plate at A receives in addition to the direct rays from the focus point at the anti-cathode, represented by the dotted line, and, in addition to other and undesirable rays from other parts of the tube, also secondary rays arising from all parts of the subject reaching A from many different directions and most seriously impairing the effect of light and shadow which a radiograph depends upon.

An observation heretofore has been published to the effect that if a hollow cylinder of opaque material of say 1½ inch caliber and 3½ inches long is placed between the fluorescent screen or photographic plate and the subject as in Fig. 2 the portion of the subject examined through the lumen of the cylinder presents greatly improved contrasts of light and shadow. This is manifestly in consequence of many diffused X-rays from different parts of the subject being excluded by the cylinder from the part of the plate or screen at A in Fig. 2.

The object of my present invention is to obtain a similar beneficial effect over the entire plate or fluoroscopic screen by the use of many such cells, as I call them, all made with thin walls and all so arranged that all the walls cast only linear shadows when the apparatus is in a proper position with relation to the X-ray tube.

As the length of the cell must be considerably greater than its width, a few large cells of say 3 inch diameter would have to be four or five inches long in order to produce a beneficial effect. They would have the advantage of presenting ease of construction and few of the linear partition shadows would be visible upon the plate or screen.

The disadvantage is that large cells with greater distance from the subject to the plate involves a magnification and blurring of the outlines of the image, just as the shadow which a candle casts of the hand upon the wall, is less clear the farther the hand is from the wall.

Further the larger area of the subject from which secondary rays may reach the portion of the plate included in a larger cell impairs the contrast of light and shade. If each cell is about three inches long and about one inch in diameter, all the above advantages are obtained. But slight magnification remains and also the following disadvantage of all long cells: The slightest deviation of the direction of the walls of a long cell from coincidence with rays from the focus results in a marked increase in the width of the shadow cast by the cell wall, This adds to the exactness with which the X-ray tube must be placed with relation to the apparatus. And so this adds to the difficulty of construction and use.

In one form of my invention the cells are rectangular and of about one inch length in the direction of the X-rays, and in section are approximately square, about ½ inch on a side. But I do not limit myself to these dimensions. In this form the cells are produced by the proper assembling of a number of partitions $a$, $a'$, say one inch in height. One set of these consists of strips of sheet material say steel, one inch wide and as long as one side of the finished rectangular apparatus is to be, say 14 inches. Another is one inch wide and as long as the other side of the finished rectangular apparatus, say 17 inches. Each of the first set has a number of slits cut in it say from the bottom half way to the top and each of the other set say from the top half way to the bottom, or vice versa. In Fig. 3 only a few slits are shown in each but it is manifest that one piece can be fitted to the other in such a way that the two standing partitions would form a cross. The slits in reality should be just wide enough to freely permit the introduction of the sheet metal.

The slits at the middle of each of the metal strips are usually vertical, but all the others are more or less oblique, or there may be none at the exact center and then all would be oblique. The obliquity of each slit is such that when all the strips are assembled each strip will be found to lie in a plane which passes through a line normal (perpendicular) to the front of the apparatus at the same selected distance, say 22 inches from the center of the front of the apparatus, and what I refer to as the front of the apparatus is the surface at which the radiating cells are smallest, or in other words the surface in front of whose plane, at a certain mathematical point in space, all the walls of the cells would meet if prolonged.

It will be noted that I make the entrance to each slot wider than the main part of the slot. This facilitates fitting them together, but is not essential.

In Fig. 5 is shown a plan view of the apparatus. All the partitions running from left to right might have the slots at the top and be placed in position first and all those running from above downward in the diagram might have their slots at the bottom and be pressed down into the slots of the other series. The number of partitions may be greater or less than shown.

As a useful accessory a frame $b$, Fig. 6, may be made of material, such as wood or metal, having a depth the same as the height of the partitions and perhaps having slots on its inside periphery along which the ends of the partitions may slide as they are assembled. The same frame may have a bottom $c$, Fig. 7, of material transparent to the X-ray such as thin aluminum or thin wood and a top $d$ of similar material. Thus the apparatus will be completely inclosed and will be held in such a way that the partitions will not become displaced. It can then be laid horizontally or held vertically between the patient and the photographic plate for radiography or in similar positions between the patient and the fluorescent screen in fluoroscopy.

With the short cells it is sufficient to merely place the X-ray tube so that its anticathode is 22 inches above the front of the apparatus and to judge by the eye as to its being in the normal or vertical line from the center, for extemporaneous use.

However, even with short cells there would be a saving of time and greater ease and certainty of securing linear shadows of the partitions by having a combined support for the apparatus and for the X-ray tube, so that the two could always be promptly placed in the right relation.

Such a combination might for example consist of a member moving vertically and having two rigid horizontal arms one sustaining my apparatus in a vertical position and the other sustaining the X-ray tube (inclosed usually in a shield) at such a position that its anticathode is 22 inches in front of the center of the front of my apparatus. Motions of the two are to be synchronous, equal, and in the same direction, so that the relation is always the same.

The familiar table with the X-ray tube at a fixed horizontal plane, under the table but moving freely in any direction in that plane, could be provided with a support connected with the shield inclosing the X-ray tube to hold the apparatus at the proper position and distance above the X-ray tube and to move it synchronously equally in the same direction as the X-ray tube.

Of course the longer the cells the more desirable would be some mechanical aid to quickly securing the right relation.

With the short cells it is a help to measure once for all the distance from the side of the frame to the upright of the tube stand when the tube is in correct position but in the absence of a patient. This relation is readily duplicated with the patient in position.

The different strips or cells may be, or may not be fastened together by solder or rivets or wire, or by leaving a part of the slot not actually cut away but bent away to admit the entering member and bent into position again to secure it. Or a frame around the periphery of the apparatus may be fastened to the ends of the strips by solder or riveting or wire. Or the frame may have slots in which the ends of the strips fit and in this case a front and back member would be useful for keeping the ends of the strips in the slots. The front and back members may be strong flat sheets as of wood or aluminum. This will serve not only to hold the strips in place, but also enable the apparatus to be laid on top of the holder containing the X-ray plate and to allow the patient to lie on top of the apparatus. With such a frame, and front and back covers, it is not entirely necessary that the strips should be soldered or otherwise fastened together. It is not entirely necessary that the frame should have grooves to receive the ends of the strips.

The apparatus for use with the fluoroscope may be simply held in proper relation to the X-ray tube and the separate fluoroscope held against what I denominate the back of the apparatus or we may have a fluoroscopic screen fastened either permanently or extemporaneously to the back.

The apparatus for use in radiography may be extemporaneously placed in relation with the X-ray plate, or it may be provided with a space below the back into which the plate holder may be slipped. A convenient arrangement would be to have legs from the corners of the frame intended to rest on the table at the proper height, to receive the plate holder underneath, as indicated at $y$, Fig. 12. Another arrangement suitable for use in a vertical, as well as a horizontal position, would be to have grooves $z$ in the frame, Fig. 13, to hold the edges of the plate holder when placed in position.

Where the X-ray tube is under the table and the apparatus is held by suitable apparatus in the proper position horizontally above the patient it is simply necessary to lay the fluoroscopic screen or the table holder on top of the back of the apparatus.

While the natural place for the anticathode is in front of the center of the apparatus a workable arrangement would be produced with the anticathode anywhere in front of the apparatus, or for a small apparatus, say six or eight inches square, the anticathode might be placed so that a line from it perpendicular to the plane of the front of the apparatus would pass outside of the apparatus altogether.

In all cases, however, the walls of the cells would have to converge toward the point in space selected for the position of the anticathode.

As illustrating the fact that my invention may be embodied in various forms reference is made to Fig. 8 in which the cells are made up of a series of concentric strips and radiating strips. These strips may be secured in proper relation to each other in any suitable manner, or they may be attached to the front and back of the apparatus. They may be secured by slitting as above described. The radiating strips or partitions may be of different lengths with their inner ends at different distances from the center. Each concentric strip is at a greater inclination to the plane of the front of the apparatus than the preceding strip.

The strip from which the concentric rings are formed may be of the sinuous or wave form of Fig. 9.

The cells may be provided in other ways than those above described, but in all cases the cell walls will vary as to the degree of their inclination in accordance with their distance from a line passing through the focus upon the anticathode and perpendicular to the plane of the front of the apparatus.

I show in Figs. 10 and 11 gage means for locating the cell diaphragm and the X-ray tube or rather the anticathode thereof relative to each other, so that these parts may be quickly set in proper position for giving the best effects. For this purpose I provide a bent rod 1 having means whereby it may be clamped to the edge of the diaphragm and as an example of such means I show a clamping member 2 pivoted at 3 to the main portion of the rod or bracket, which has a foot portion 4 to engage the underside of the diaphragm. A stop 5 is arranged to adjust the gage device in position against the edge of the cell diaphragm and a thumb screw 6 is employed to clamp the device in place. The horizontal portion 1' of the gage rod is intended to indicate by the location of its point at its extreme end, or of a point say at 7 back from its extreme end, the position or point over which the anticathode is to be located at a specified distance therefrom.

Assuming that the cell diaphragm is seventeen inches long and fourteen inches wide if the gage device is applied to the short side of the diaphragm at the middle thereof then the extreme end of the horizontal portion 1' will indicate the point over which the anticathode is to be located, this point being exactly over the center of the cell diaphragm.

Fig. 11 represents the apparatus viewed a quarter turn from the point of view in Fig. 10 from which it will be seen that having applied the gage device to the cell diaphragm it is only necessary to locate the X-ray tube above the extreme point of the arm 1' centrally when viewed from the position of Fig. 10 and also from the position of Fig. 11, whereupon the anticathode will be located directly over the center of the front of the cell diaphragm and at the proper distance therefrom. The X-ray tube is supported as usual in the tube stand indicated diagrammatically at 8. The tube of course is always placed in the same position in the tube stand or shield.

I do not limit myself to attaching the gage rod to the cell diaphragm, as shown, nor to the short side thereof. It may be applied to the middle of the long side, in which case the spot over which the anticathode would be located would be the point 7 and with the proportion of parts shown this point would be one and one-half inches back from the extreme end of the rod.

The gage rod might be otherwise mounted than as illustrated herein.

What I claim is:

1. In combination with an X-ray tube, means for excluding rays, diffused by the subject, from the fluoroscopic plate upon which the image is taken, comprising a plurality of cells made up of two sets of strips opaque to X-rays, the strips of one set crossing those of the other set slitted to interlock therewith and inclining to different degrees in respect to each other, the major axis of each cell inclining to the focus point.

2. A cell diaphragm comprising two sets of strips crossing each other and inclined to the plane of the diaphragm to different degrees in respect to each other, said crossing strips being slitted to interlock, substantially as described.

3. A cell diaphragm comprising two sets of strips crossing each other and inclined to the plane of the diaphragm, said crossing strips being slitted to interlock, the degree of inclination of the strip increasing according to the distance of the strips from the center of the diaphragm, substantially as described.

4. In combination with an X-ray tube means for excluding rays, diffused by the subject, from the plate or fluoroscopic screen upon which the image is taken comprising a plurality of cells made up of strips crossing each other and a frame having notches receiving the ends of the strips, substantially as described.

In testimony whereof, I affix my signature.

SINCLAIR TOUSEY.